United States Patent Office 3,486,916
Patented Dec. 30, 1969

3,486,916
CEMENT MIXES AND THE PRODUCTION OF ARTICLES THEREFROM
William A. Cordon, 1090 North 1800 East, Logan, Utah 84321
No Drawing. Continuation-in-part of application Ser. No. 591,075, Nov. 1, 1966. This application Dec. 22, 1966, Ser. No. 603,783
Int. Cl. C04b 7/00
U.S. Cl. 106—90    9 Claims

ABSTRACT OF THE DISCLOSURE

An admixture for hydraulic cement mixes comprising an emulsion in water of a fatty alcohol having from 14 to 20 carbon atoms, which emulsion is added to a mix before pouring and concentrates in the bleed water of the mix after pouring to form an evaporation-inhibiting film.

---

This application is a continuation-in-part of an application having Ser. No. 591,075, filed Nov. 1, 1966, now abandoned.

This invention relates to hydraulic cement mixes, to methods of their preparation, and to methods of producing a consolidated product from such mixes. More particularly, the invention concerns novel cement mixes exhibiting beneficial evaporation characteristics facilitating the manufacture of articles from the mixes, making possible the production of final consolidated articles having improved physical properties.

As used herein, the term hydraulic cement mix is intended to include building material mixes comprising cement as a principal binding agent, water, and some form of aggregate such as sand, gravel or broken stone. Thus the term includes within its definition various types of mixes including those sometimes more specifically referred to as concrete and mortar mixes.

A cement mix on being poured to form an article such as a slab or other flatwork, sets over a period of time with the cement binding together the mass within the mix. After pouring, the cement mix is usually worked, and the exposed surface of the mix finished as by smoothing it. Some bleeding of a cement mix may occur after pouring, with water in the poured mass of mix migrating to the bounding surfaces of the mass. It is generally preferable to limit the amount of water employed in a cement mix, as such has been found to result in the production of hardened articles having maximum strength. With relatively dry mixes, the bleeding of water may be interfered with, to an extent detrimental to the working and finishing of the final hardened product. It is important, moreover, that the evaporation of surface water produced by bleeding be retarded, whereby the plasticity of a cement mix over its bounding surfaces be retained for some period of time. This is particularly true of cement mixes of a relatively dry consistency. Further, if evaporation of free water occurs too rapidly, as may be a particular problem on hot, dry days, scaling and other undesirable results tend to occur.

One object of this invention is to provide improvements in cement mixes characterized by a retarded rate of evaporation of free water in the mixes, in comparision to mixes produced by conventional procedures.

A related object is to provide a novel method of producing consolidated products from cement mixes which enables minimal water to be employed while retaining workability and ease of finishing in the mixes.

It has been the practice in the art to incorporate with a cement mix comprising cement, aggregate, and water, admixtures designed to improve certain physical properties of the mix. Thus, the ligno sulfonate product obtained from waste sulfite pulping liquor has been employed as a cement dispersing agent, to enable the use of a smaller amount of water while retaining workability in a mix. As already briefly indicated, with a relatively small amount of water employed in a mix, control of the evaporation of free water produced by bleeding is particularly important, since the total amount of water in the mix is limited. This invention, therefore, more particularly concerns cement mixes including an admixture promoting cement dispersion, permitting a reduction in the water used in the mix in comparison with conventional mixes.

According to a preferred embodiment of the invention, an evaporation retardant is contemplated for a cement mix, in the form of an admixture to be introduced to the mix before pouring of the mix. The admixture may be an emulsion, comprising a relatively high molecular weight, aliphatic, organic compound, containing lyophilic and lyophobic groups, water, and an emulsifier, which may be anionic, non-ionic or a mixture of the two. The relatively high molecular weight aliphatic organic compound has a melting point which is somewhat above room temperature, and as a consequence is a solid at room temperature. The emulsifier is present in the admixture, for the purpose of obtaining proper dispersion of the organic compound when the admixture is incorporated with the cement mix. The admixture further preferably includes a relatively low molecular weight aliphatic alcohol, which is included to enhance emulsification of the high molecular weight organic compound, and to aid in imparting bleeding properties to a cement mix.

While the exact manner in which the admixture operates to retard the evaporation of free water and to increase workability in a relatively dry concrete mix is not entirely understood, it appears that after pouring of the mix and with bleeding to produce some free surface water on the article poured, the high molecular weight organic compound becomes concentrated on the surface of the poured mix and forms a surface film which is distributed over such surface. This film functions as a barrier inhibiting the travel of water molecules therethrough and into the atmosphere. The lyophilic groups within the organic compounds are attracted to the water molecules in the water, and the organic compound becomes oriented with its lyophobic or non-polar portions repelled from such free surface water. Quite surprisingly, even though the admixture containing the high molecular weight organic compound is initially incorporated into the cement mix by being distributed completely therethroughout, on being poured a sufficient concentration of the compound collects on the free water produced by bleeding to provide the barrier described effective in retarding water evaporation. The compound, which is a solid, is relatively non-volatile, and thus provides the protective surface film for a period sufficient to enable relatively easy spreading and finishing of the poured article. Such evaporation of free surface water as does occur takes place relatively slowly, thus inhibiting surface cracking and other defects and promoting the production of a sounder product.

The admixture has been found to promote bleeding in relatively dry cement mixes, with the production of such a protective surface film on the free bleed water of such mixes.

Various other objects and advantages of the invention will become more fully apparent from reading of the following description, which contains certain specific examples included to illustrate the invention, but not intended by way of limitation with respect to the specific details set forth therein.

As already indicated briefly above, the compounds which have been found to be effective in the production of an evaporation-retardant film on the exposed surface of a poured cement mix article comprise relatively high molecular weight, aliphatic, organic compounds including lyophilic and lyophobic portions. Thus, included within the general class of compounds are the fatty acids, fatty alcohols, and the esters and amides thereof. Such compounds may typically contain from 14 to 20 carbon atoms in their aliphatic, hydrocarbon chains. In a preferred embodiment of the invention, fatty alcohols containing from 14 to 20 carbon atoms in their molecular structure are employed, exemplified by such alcohols as myristic alcohol, cetyl alcohol, stearyl alcohol and arachidic alcohol, all of which are solids at room temperature (75° F.) and compatible with other constituents in the admixture. Partly by reason of their availability, and because good spreadability together with a retarding of evaporation is obtained through their use, a combination of cetyl and stearyl alcohols have been employed in particular, with the higher melting point stearyl alcohol promoting resistance to evaporation and the lower melting point cetyl alcohol promoting spreadability in a cement mix containing the admixture.

From the above description it may be seen that in general terms the high molecular weight, aliphatic, organic compounds contemplated generally may be described as having molecular weights above about 200. Also, it should be understood that in describing the organic compounds suitable for use in the invention, it is recognized that certain fatty alcohols of a commercial grade may comprise as impurities other alcohols than the alcohol for which the commercial grade is named, and such may have molecular structures containing more or less carbon atoms than set forth in the range indicated. Such impurities are a minor part of the material, usually less than 25%. Such commercial grades are solids at room temperature, and are employable in practicing the present invention.

Exemplifying emulsifiers such as may be employed in dispersing the aliphatic organic compound are such materials as Span (sorbitan monostearate), Tween (a polysorbate), Renex 20 (a polyoxyethylene ester of mixed fatty and resin acids), and Ethofat (a polyoxyethylene ester of mixed fatty acids).

It is preferred in carrying out the invention that an aliphatic alcohol having from one to five carbon atoms be further included in the admixture together with the emulsifier and relatively high molecular weight aliphatic organic compound. These relatively low molecular weight alcohols promote emulsification, wherby better distribution of the high molecular weight material within the hydraulic cement mix is realized. Further, and very important, the alcohols have been noted to aid in imparting bleeding properties to the cement mix. Exemplifying such aliphatic, relatively low molecular weight alcohols, are methyl alcohol, ethyl alcohol, isopropyl alcohol, butyl alcohol, and amyl alcohol.

To obtain maximum ease of preparation, and to facilitate dispersion of the relatively high molecular weight organic compound in a cement mix, ordinarily an aqueous emulsion of water, the relatively high molecular weight organic compound, emulsifier, and low molecular weight aliphatic alcohol is prepared separately. Frequently, about equal parts on a weight basis of the organic compound, emulsifier, and alcohol are employed in producing the aqueous emulsion. To further illustrate, emulsions have been used as an admixture for a cement mix containing one part organic compound, one part emulsifier, one part aliphatic alcohol and 97 parts water (unless otherwise indcated, parts herein refer to parts by weight). When the amount of fatty alcohol or high molecular weight organic compound in the emulsion is increased an emulsion of much thicker consistency is formed, with sufficiently high concentrations of the alcohol, above about three parts by weight in the above formulation, producing thick pastes which are more difficult to incorporate with a hydraulic cement mix. With lower proportions of the fatty alcohol in the emulsion, a relatively dilute mixture is produced which may be uneconomical to make, ship and store. The amount of emulsifier used is subject to variation, with the specific proportion employed in a given instance being that which is sufficient to produce easy emulsification of the constituents indicated. Where a relatively low molecular weight aliphatic alcohol is utilized to enhance bleeding properties, ordinarily proportions ranging from about one-quarter to about four times the amount of fatty alcohol are employed.

As mentioned above, cement dispersing agents are sometimes included in cement mixes to enable a reduction in the amount of water required to obtain a mix with the necessary plasticity. Exemplifying such a cement dispersant is sodium ligno sulfonate an waste sulfite liquor, which contains as a principal constituent such alkali ligno sulfonate. In using such a cement dispersant, it is common to employ about .2 part of the dispersant per 100 parts of cement in the cement mix. These proportions, of course, may be varied, with a reduction, for instance, to one-half of the indicated amount making necessary increased amounts of water with some reduction in strength to be expected in the final concrete article, and with a proportion of dispersant exceeding about four times the indicated amount sometimes resulting in more than desired entrained air. The proportions of evaporation retarding emulsion included in the usual cement mix ranges from about 0.025 to 0.5 part of the emulsion per 100 parts of cement in the mix. These proportions are subject to adjustment of course, with a change in the concentration of the fatty alcohol in the emulsion.

In preparing the cement mixes of the invention, the evaporation retarding admixture may be introduced to the cement mix and then distributed by further mixing prior to pouring of the mix into a form. The constituents of the admixture, however, may be introduced to the constituents forming the cement mix at other times, although such may introduce some problems in obtaining maximum utilization and efficient and easy distribution of the constituents forming the admixture.

The following examples serve further to illustrate various features of the present invention. In preparing the examples, the portland cement, water, and aggregate forming a cement mix were mixed with each other in a conventional manner. Where compressive strengths are indicated, such were determined in accordance with standard procedures. Unless otherwise indicated in the examples, parts of constituents are based on 100 parts of cement.

EXAMPLE I

One cement mix (a control mix of the mortar type) was prepared by mixing together 100 parts cement, 250 parts sand, and 55 parts water. A second cement mix was prepared, using the same proportions of cement, sand, and water, and with the further inclusion into the mix before pouring of 0.2 part of an emulsion or evaporation retardant prepared from one part fatty alcohol (a 1:1 mixture of cetyl and stearyl alcohols), one part emulsifier (Renex 20), 1 part ethyl alcohol, and 97 parts water. Samples from the two mixes were poured into shallow pans, which were stored at relatively low humidity (25–40%) and at room temperature (approximately 75° F.). A fan was placed adjacent the pans to create a current of air thereover simulating wind. The evaporation of water from the samples was permitted to proceed, and after the expiration of one, two, and four hours, the amount of water which had evaporated from the pans was determined. The findings obtained are tabulated in Table 1 below, which sets forth the amount of water evaporation noted in the mix containing evaporation retardant in relation to the evaporation of water noted in the control mix.

TABLE I

|  | Evaporation, percent of control | | |
| --- | --- | --- | --- |
|  | 1 hr. | 2 hr. | 4 hr. |
| Mix #1 (control) | 100 | 100 | 100 |
| Mix #2 (containing retardant) | 26 | 24 | 41 |

Cubes were also prepared from the two mixes, which were tested for compressive strength after seven days. The compressive strength of the cubes prepared from both mixes was substantially the same.

When a cement mix includes a cement dispersant, such as sodium or calcium ligno sulfonate, entrainment of air within the mix tends to increase, which has been found to inhibit bleeding of the mix. With a reduction in bleeding and the formation of less free water on the surface of a poured article, it might be expected that the addition to a mix of the retardant admixture contemplated would have negligible effect. However, it has been established that advantageous control of evaporation does result, as indicated by the following example:

EXAMPLE II

A control cement mix was prepared, which was the same as the control mix in Example I except that it contained 0.2 part Zeecon R (a sodium ligno sulfonate product derived from waste sulphite liquor produced by Crown Zellerbach Corporation). A second cement mix was prepared similar to the second mix prepared in Example I, but modified to the extent that 0.2 part Zeecon R was also included in the mix. Samples from both mixes were poured into shallow pans, and subjected to the humidity, temperature, and air current conditions set forth in Example I. The following table summarizes findings made with respect to water evaporation from the samples.

TABLE II

|  | Evaporation, percent of control | | |
| --- | --- | --- | --- |
|  | 1 hr. | 2 hr. | 4 hr. |
| Mix #1 (control containing Zeecon R) | 100 | 100 | 100 |
| Mix #2 (containing Zeecon R and retardant) | 29 | 31 | 39 |

It has also been determined that the addition of the evaporation retardant admixture to a cement mix produces important advantages in a mix including a cement dispersant where a reduced amount of water is employed in preparing the mix. The following example illustrates evaporation results noted with a cement mix prepared to a drier consistency, and with exposure to both wind and sun.

EXAMPLE III

A control mix was prepared which was the same as the control mix of Example I. A second cement mix with evaporation retardant was prepared, through modification of the control mix to the extent that the amount of water included was reduced to 50.6 parts, and there was further added to the mix 0.1 part of the evaporation retardant or emulsion set forth in Example I, and 0.2 part Zeecon R. Samples from both of such mixes were poured into shallow pans, and stored under the conditions set forth in Example I. Other samples from both of such mixes were stored by placing them under the sun. After more than one hour, the various samples were tested to determine the extent of water evaporation that had taken place. The findings obtained are tabulated below.

TABLE III

|  | Evaporation, percent of control | |
| --- | --- | --- |
|  | Wind | Sun |
| Mix #1 (control) | 100 | 100 |
| Mix #2 (containing reduced water, Zeecon R, and retardant) | 36 | 63 |

It will be noted from this example that significant results were obtained even though a reduced amount of evaporation retardant admixture was employed.

Further illustrating the invention is the following example, wherein concrete-type cement mixes were prepared, one containing a cement dispersant and a reduced amount of water.

EXAMPLE IV

A conventional so-called five-bag concrete mix was prepared by mixing five bags of cement with aggregate comprising about one-third sand and two-thirds gravel, and water, to produce a cubic yard of total product. The added water produced a workable consistency in the mix. This mix was employed as a control mix. Another mix was prepared using the same proportions of cement and aggregate. The evaporation retardant of Example I was also added, in an amount equalling 0.2% by weight of the cement employed. The second mix further included 0.2% Zeecon R, based on the dry weight of cement. Sufficient water was used in the second mix to produce a slump in the mix equalling the slump of the first mix (the amount of water used was about 91% of the water used for the first mix because of the presence of the Zeecon R). Samples from the mixes were poured into pans and stored for a period of one hour. Some of the samples were exposed to wind conditions, and some were exposed to the radiant heat of the sun. After the one-hour period, the amount of water evaporation that had taken place was determined. The following table summarizes the results obtained. Also tabulated is the compressive strength of the samples after a 7 day and 28 day period.

TABLE IV

|  | Evaporation, percent of control | | Strength | |
| --- | --- | --- | --- | --- |
|  | Wind | Sun | 7 days | 28 days |
| Mix #1 (control) | 100 | 100 | 3,000 | 4,720 |
| Mix #2 (with Zeecon R, reduced water, and retardant) | 15 | 64 | 4,070 | 5,350 |

With the evaporation retardant admixture of the invention incorporated in a cement mix, bleeding of water to the surface of the poured mix is enhanced, which together with the evaporation retardant characteristic of admixture has the effect of retaining spreadability and finishing ease in the poured mass for a time period sufficient to enable such operations to be performed. The following example illustrates improvements in bleedability obtained by including the admixture of the invention, and the ability of a cement mix with such admixture to retain free water produced by bleeding over a period of time.

EXAMPLE V

A control mix was prepared which was the same as the control mix of Example I. A second mix was prepared similar to the control mix, but modified to the extent that 0.2 part of a cement dispersant, namely Zeecon R, was included. A third mix was prepared, similarly to the second mix, but additionally modified by the addition of 0.05 part of an evaporation retardant admixture comprising an aqueous emulsion formed of one part cetyl and stearyl alcohols, one part Renex 20, 1.5 parts isopropanol and 96.5 parts water. A fourth mix was prepared similar to the second mix, but modified to the extent that twice as much of the evaporation retardant admixture was added. Samples were poured into shallow pans, and placed in a 100% humidity room for a period of 45 minutes. The samples were then removed, and allowed to dry under a fan simulating wind current. The amount of free water which had collected on the samples after the 45-minute period in the 100% humidity room, and the amount of free water retained after subsequent drying were measured. The results obtained are tabulated in the following table:

TABLE V

| | Grams of Bleed Water Expressed after 45 min., 100% R.H. | Grams of Bleed Water retained after drying | |
|---|---|---|---|
| | | 1½ hrs. | 2 hrs |
| Mix #1 (control) | 9 | 3 | Dry |
| Mix #2 (Zeecon R included) | 2 | Dry | Dry |
| Mix #3 (Zeecon R and retardant included) | 12 | 10 | 8 |
| Mix #4 (Zeecon R and retardant included) | 23 | 26 | 23 |

It will be noted from the tabulated results that in mixes #1 and #2, were no evaporation restardant admixture was included, a relatively small amount of bleed water collected as free water on the samples. With the evaporation retardant included, a substantial increase in bleed water was noted. Further, there was little reduction in this bleed water after the end of a two-hour period.

In obtaining increased bleeding the inclusion of a relatively short chain aliphatic alcohol produces optimum results.

EXAMPLE VI

A cement mix used as a control mix was prepared from 100 parts of cement, 250 parts sand and 58.7 parts water. A second mix was prepared which was similar to the control mix, save that the amount of water utilized was reduced to 55 parts, and 0.1 part of Zeecon R was included. Further, an evaporation retardant admixture was included comprising 0.025 part of an emulsion of one part cetyl and stearyl alcohols (1:1 ratio), one part of a mixture formed of Span and Tween (emulsifier), and 98 parts water, and 0.05 part of an emulsion comprising one part cetyl and stearyl alcohols, one part Renex 20, one part ethyl alcohol, and 97 parts water. A third cement mix was prepared similar to the second mix, save that the evaporation retardant admixture used was 0.075 part of an emulsion comprising one part cetyl and stearyl alcohol, one part Renex 20, one and one-half parts isopropanol, and 96.5 parts water. Samples of these mixes were placed in shallow pans in a 100% humidity room for one hour. At the end of this period, 11 grams of free water were collected from the control mix sample, 16 grams of free water were collected from the second prepared mix, and 22 grams of water were collected from the third prepared mix including the greater amount of short chain aliphatic alcohol.

In carrying out the herein disclosed invention, and where it is contemplated that both the evaporation retardant and a cement dispersant be included in a cement mix with the advantages above indicated, ordinarily an additive composition is prepared by mixing the evaporation retardant and the cement dispersant separately from the constituents of the cement mix. The proportions selected for the preparation of such an additive composition are determined by the proportion of evaporation retardant to cement dispersant desired in the final cement mix. The procedure of preparing the admixture composition separately has been found to promote ease of handling and mixing of constituents. The procedure of separate mixing of the dispersant and evaporation retardant was followed, for instance, in preparing the mix #2 discussed in Example 2.

Describing in particular the preparation of an additive composition, and considering a composition where the ratio of evaporation retardant to dispersant of one to two is desired with the retardant having the formulation set forth in Example 1, an aqueous solution of dispersant was prepared containing 50 parts water and 50 parts dispersant (Zeecon R). Mixed with such 100 parts of solution were 25 parts of the evaporation retardant set forth in Example 1 (i.e. an aqueous emulsion containing 3% by way of active ingredients in the form of fatty alcohol, emulsifier, and aliphatic alcohol). Such ingredients preferably are intimately blended together, as by running them through a colloid mill. The resulting composition had a total solids content of about 40%.

Such a composition as a premix is readily distributed to cement mixing plants, and the composition itself is easily incorporated in a cement mix with complete dispersion of its ingredients within the mix.

It is preferred in preparing such additive compositions that the evaporation retardant have an active ingredient concentration of not more than about 7% by weight. With a greater concentration, the emulsion tends to become too thick to be handled readily.

It will be seen from the above that compositions are contemplated by the invention which facilitate by enhancing spreadability and ease of finishing the manufacture of articles from poured cement mixes. The production of free water on poured, hydraulic concrete masses produced by bleeding in the mass is promoted, and the evaporation of such bleed water is retarded for a significant timed period. This retarding is during the setting period for the mix and prior to the curing stage of any hardened mass. This retarding of evaporation occurs both under wind current conditions, and under radiant heat conditions. Together with ease in finishing, a superior type of produce is formed, since with the prevention of rapid evaporation of free water from the surface of a poured mass, one of the principal causes of cracking and other defects in formed articles is eliminated. The cement mixes in the examples prepared according to the invention have all demonstrated good plasticity in relation to the amount of water incorporated in the mix.

It is recognized that certain other ingredients may be incorporated into cement mixes for obtaining special properties, such as air entraining agents, pigments, etc. Also, other cement dispersants are usable such as hydroxy carboxylic acids and carbohydrates. In practicing this invention, it is not intended to preclude the use of such additional additives or other constituents as may be dictated by the special needs of a particular construction project.

Of particular importance, it should be noted that meaningful amounts of the relatively high molecular weight organic material tend by bleeding and by other means to collect over the free water in the poured mix to form the evaporation retardant protective film which is the result of the invention. Thus, no special treatment of an already prepared cement mass is necessary to obtain the retarding of evaporation desired. The inclusion in the cement mixes of the evaporation retardant admixture, moreover, does not detract from the strength properties of articles formed by the mixes, and in some instances may in fact actually enhance properties.

Whereas various forms of the invention have been described herein, it is appreciated that different procedures may be employed in preparing the mixes, as well as different concentrations and ingredients than those specifically set forth in the examples herein. It is not intended that the invention be specifically limited by the examples, as it is desired to cover all such modifications and variations of the invention as would be apparent to one skilled in the art and that come within the scope of the appended claims.

It is claimed and desired to secure by Letters Patent:
1. The method of inhibiting the evaporation of water from the exterior surface of a poured mass of a hydraulic cement mix including cement, aggregate, and water, comprising distributing in the mix prior to pouring an evaporation retardant comprising fatty alcohol having from 14 to 20 carbon atoms, pouring the mix to form a poured mass bounded by such exterior surface, and through bleeding of water in the mix after pouring forming free surface water on the exterior surface of the poured mass to produce a concentration of the fatty alcohol over the exterior surface of the poured mass which becomes distributed as a protective film over the surface.

2. The method of claim 1 wherein the cement mix includes a cement dispersant, and the evaporation retardant further comprises an aliphatic alcohol having having not more than about 5 carbon atoms.

3. The method of claim 1 wherein the evaporation retardant comprises an emulsion prepared prior to introducing the retardant to the cement mix, and the emulsion includes, in addition to the fatty alcohol specified in claim 1, an emulsifier, an aliphatic alcohol having not more than about 5 carbon atoms, and water.

4. The method of claim 1 wherein the cement mix includes a cement dispersant permitting the employment of a reduced amount of water in the mix, the evaporation retardant comprises an emulsion prepared prior to introducing the retardant to the cement mix, and the emulsion includes, in addition to the fatty alcohol specified in claim 1, an emulsifier, an aliphatic alcohol having not more than about 5 carbon atoms, and water.

5. The method of producing an article through setting of a hydraulic cement mix comprising preparing a hydraulic cement mix from cement, aggregate, water, and a fatty alcohol having from 14 to 20 carbon atoms, which fatty alcohol is dispersed in the water of the mix, pouring a mass of such mix into a form and with standing of the mass producing bleeding of water to the surface of the mass to form a collection of free surface water on the surface of the mass, forming from such fatty alcohol in such surface water a water evaporation retarding film of the fatty alcohol which film is distributed over the surface of the poured mass, and finishing the surface of the poured mass with plasticity maintained in the mass by the surface water.

6. The method of claim 5 wherein bleeding is promoted by including in the cement mix prior to pouring an aliphatic alcohol having not more than about 5 carbon atoms.

7. The method of claim 5 wherein the mix includes a cement dispersant and is prepared with less water than a mix having equal slump and like composition save for the exclusion of the dispersant, and wherein bleeding is promoted by including in the cement mix prior to pouring an aliphatic alcohol having not more than about 5 carbon atoms.

8. An additive composition for a hydraulic cement mix comprising an aqueous mixture of a cement dispersant, a fatty alcohol having from 14 to 20 carbon atoms, and an emulsifier for said fatty alcohol.

9. An additive composition for cement comprising an aqueous mixture of an alkali lignosulfonate, a fatty alcohol having from about 14 to about 20 carbon atoms, an emulsifier for said fatty alcohol, and a lower aliphatic alcohol having from 1 to about 5 carbon atoms.

References Cited

UNITED STATES PATENTS

| | | | |
|---|---|---|---|
| 2,965,678 | 12/1960 | Sundberg et al. | |
| 2,776,713 | 1/1957 | Morgan et al. | |
| 2,243,501 | 5/1941 | Daimler. | |
| 3,392,222 | 7/1968 | Cordon | 264—79 |
| 3,097,955 | 7/1963 | Harris | 106—95 |
| 3,090,693 | 5/1963 | Kelly et al. | 106—93 |
| 3,022,824 | 2/1962 | Binkley et al. | 166—31 |
| 2,801,931 | 8/1957 | Morgan et al. | 106—90 |
| 2,798,003 | 7/1957 | Morgan et al. | 106—90 |
| 2,776,010 | 1/1957 | Rike | 166—21 |
| 2,364,555 | 12/1944 | Scripture | 106—90 |
| 2,284,023 | 5/1942 | Scripture | 106—314 |
| 2,003,613 | 5/1932 | Scripture | 106—95 |

TOBIAS E. LEVOW, Primary Examiner

W. T. SCOTT, Assistant Examiner

U.S. Cl. X.R.

106—95, 314